June 15, 1926.
F. H. WEEKS
GAUGE FOR CUT-OFF SAW BENCHES
Filed Sept. 15, 1925
1,589,276
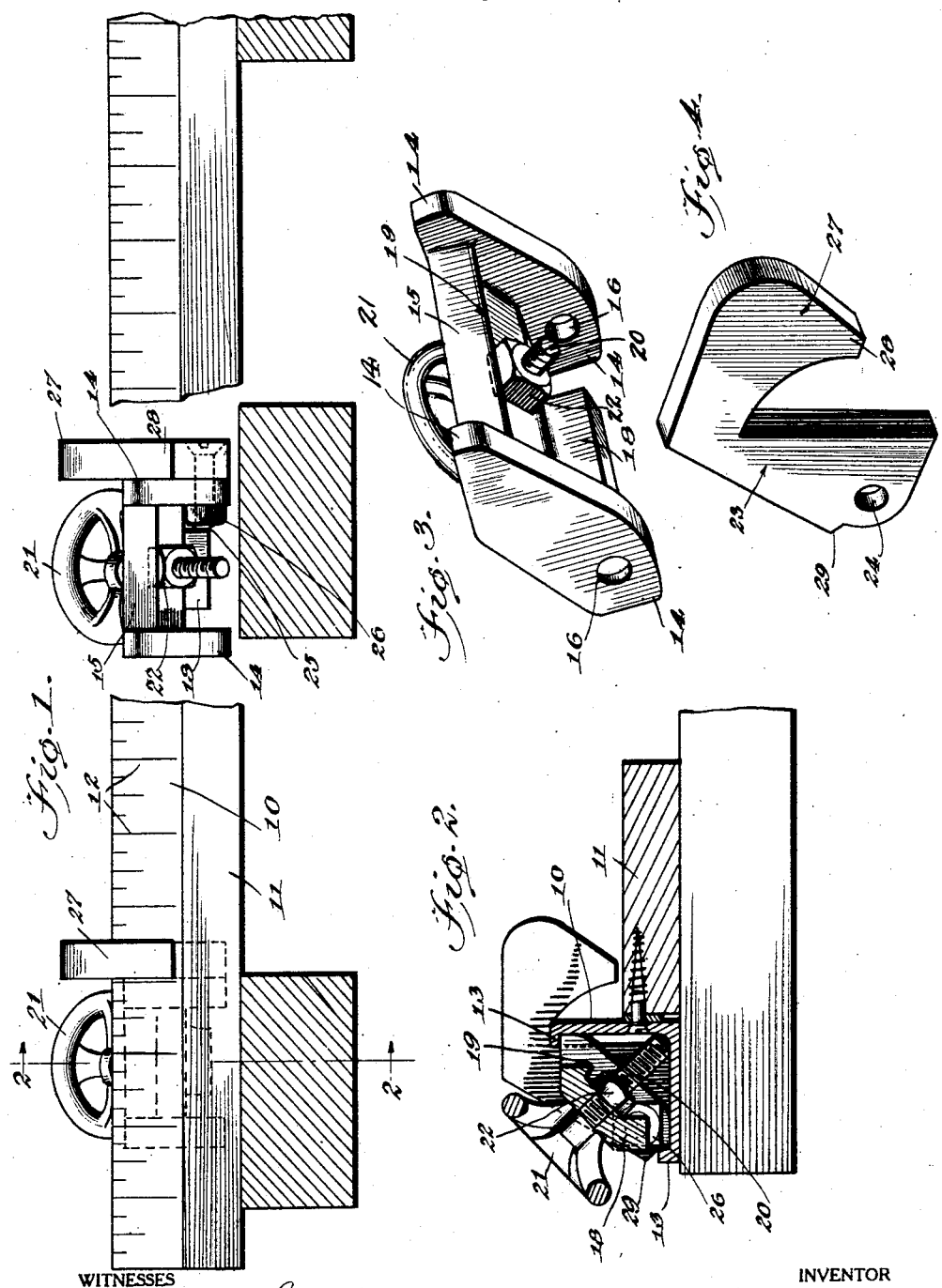
WITNESSES
INVENTOR
F. H. Weeks,
BY
ATTORNEYS Patented June 15, 1926.

1,589,276

UNITED STATES PATENT OFFICE.

FREDERICK H. WEEKS, OF AKRON, OHIO.

GAUGE FOR CUT-OFF SAW BENCHES.

Application filed September 15, 1925. Serial No. 56,518.

My present invention relates generally to gauges, and more particularly to a gauge of the type utilized in connection with cut-off saw benches wherein a gauge beam is extended along a bench and a plurality of gauge members adjustably fixed along the gauge beam and so positioned that a selected gauge member may be utilized to the exclusion of the others.

A primary object of my present improvement is the provision of a strong, durable gauge wherein the gauge members cooperate with the beam in their clamped positions to add to the strength of the latter, and wherein the gauge elements are automatically shiftable to an inactive position and likewise movable automatically to active position when the gauged object is removed from the beam.

In the accompanying drawing which illustrates my present invention and forms a part of this specification, Figure 1 is a side elevation showing a portion of the gauge beam and certain of the gauge members, the beam being partly broken away to expose one of the gauge members in full lines, Figure 2 is a vertical cross section taken substantially on the line 2—2 of Figure 1, through the gauge beam and one of the gauge members, Figure 3 is a detail perspective view of the frame of one of the gauge members, and Figure 4 is a detail perspective view of one of the movable gauge elements.

Referring now to these figures, my invention proposes an elongated gauge beam 10 adapted for use along one side of a cut-off saw bench generally indicated at 11, the beam 10 being of suitable length and having desired graduations 12 along its face upon that portion exposed above the top of the bench, and against which the work to be gauged is shifted in practice.

The gauge beam 10 is furthermore, in accordance with my invention, suitably flanged along its longitudinal edges to cooperate with the frames of the gauge members having portions adapted to extend beneath the flanges, and while the particular shape may be varied to a considerable extent, I have shown the beam 10 in the present instance, in the form of an angle bar as especially shown in Figure 2, with flanges 13 turned toward one another to receive beneath the same the corner projections 14 of the frame 15 of each of the gauge members. Each of these frames has openings 16 through its sides, and a single opening 17 through its body, the latter being provided upon its inner surface with spaced apart projections 18 and 19 of which the former is opposite to and between the side openings 16 for a purpose which will be presently described.

Through the opening 17 of the body 15 a threaded stem 20 is extended, which stem has a handle 21 at its outer end and works through a nut 22 against the inner surface of the frame 15 and confined against rotation between the projections 18 and 19 whereby the opposite end of the bolt may thus act as a jamb lock by virtue of its pressure against the beam 10 to force the end projections 14 of the frame 15 against and in locking engagement with the flanges 13 of the beam.

Each of the gauge members which may be shifted along the beam and adjustably locked at selected points by the above mentioned means, carries a gauge element 23 apertured as at 24 to receive a pivot bolt 25. This pivot bolt 25 as indicated in Figure 1, extends through one of the side openings 16 of the frame 15, and also through a nut 26 and abuts one side of the projection 18 of the frame, whereby the nut 26 may be utilized as a lock nut to securely anchor the pivot bolt, and at the same time allow free pivotal movement of the gauge element 23.

The gauge element 23 has in addition an angular extension 27 adapted in the normal position to extend over the upper edge of the gauge beam 10 and forwardly and downwardly of the latter, and this extension with its rounded nose 28 moves upwardly and rearwardly when a beam to be gauged is shifted toward the gauge beam 10 so that all of the gauge elements between the saw and the gauge element in particular use at that time will be moved on their pivot bolts 25 to inactive position, ready however, to instantly and automatically resume their active positions shown in full lines in Figure 2, when the sawed beam or board has been removed. For this purpose, each of the gauge elements 23 has adjacent to its pivot opening 24 a shoulder 29 as seen in Figures 2 to 4, which engages one of the flanges of the gauge beam 10 when the element 23 is shifted upwardly and outwardly to limit such movement and prevent swinging of the gauge element beyond an upright or vertical position.

It is obvious from the foregoing that my improved gauge includes parts which cooperate to produce strength and durability, each of the gauge members when clamped in connection with the beam obviously acting as a brace by virtue of the fact that it is wedged in connection with the beam flanges. My invention moreover provides for the ready adjustment and easy clamping and disconnection of the several gauge members, and as above described, permits of the automatic shifting of the gauge elements into and out of active position.

I claim:—

1. A gauge of the character described, including an angular gauge beam, having inturned flanges, a gauge member slidable along the beam and having a frame provided with portions extending beneath the flanges of the beam for clamping engagement therewith, and a jamb member operating through said frame and engageable with the beam at the juncture of its angular portions to wedge the gauge in connection therewith.

2. A saw bench gauge including a gauge beam having inwardly flanged edges, a gauge member slidable along the beam within said flanges, and having a wedge engageable with said flanges, and a jamb member operating through the wedge and engaging with the beam to lock and release the wedge.

3. A saw bench gauge including a gauge beam, gauge members adjustably secured along the beam, and gauge elements carried by the said gauge members having pivotal mountings upon which the elements are shiftable by gravity into active position and having their free ends angled to permit of automatic shifting of the elements into inactive position by the work.

4. A saw bench gauge including a gauge beam, a series of gauge members adjustably clamped in connection with the beam at spaced points therealong, and a gauge element pivoted in connection with each of said members, said gauge element being shiftable by the work into inactive position in use and movable by gravity into active position relative to the gauge beam.

5. A saw bench gauge including a gauge beam having flanged edges, a gauge member including a frame having portions engageable with said edges, a threaded jamb member working through said frame, a nut non-rotatably positioned in connection with the frame and through which said jamb member extends, an adjusting handle upon the outer end of the jamb member, and a gauge element pivotally supported in connection with one side of the frame and having a portion adapted to extend over the beam and maintained by its own weight in operative relation to the beam.

6. A saw bench gauge including a gauge beam having flanged edges, a gauge member, including a frame having portions engageable with said edges, a threaded jamb member working through said frame, a nut non-rotatably positioned in connection with the frame and through which said jamb member extends, an adjusting handle upon the outer end of the jamb member, and a gauge element pivotally supported in connection with one side of the frame and having a portion adapted to extend over the beam and maintained by its own weight in operative relation to the beam, said gauge element having a shoulder engageable with a portion of the beam to prevent movement of the gauge element upwardly beyond a vertical position for the purpose described.

FREDERICK H. WEEKS.